UNITED STATES PATENT OFFICE 2,259,980

OIL COMPOSITION

Herbert John West, Riverside, and Ralph Earl Layman, Jr., Old Greenwich, Conn., assignors to American Cyanamid Company, New York, N. Y., a corporation of Maine No Drawing. Application February 25, 1939, Serial No. 258,566

9 Claims. (Cl. 260—21)

This invention relates to aminotriazine-resin-modified oil compositions containing glyceride oils together with aminotriazine-aldehyde condensation products. The invention includes the compositions themselves, their methods of manufacture, and paints, varnishes and enamels containing them.

We have found that the film-forming characteristics of glyceride oils such as non-drying, semi-drying and drying oils are greatly improved by the incorporation of aminotriazine-aldehyde condensation products therein. Drying and semi-drying oils containing such condensation products will bake to films of greater hardness, water resistance and color retention than will the untreated oils, and improved baking enamels can also be prepared from non-drying oils such as coconut oil, castor oil and the like.

We have found that the product obtained upon refluxing uncured aminotriazine-aldehyde condensation products with acidified alcohols can be heated with glyceride oils at temperatures as high as 180–220° C. without gelation or premature resinification, and that a clear and uniform dispersion of the resin in the oil is obtained by holding the mixture at these temperatures for suitable periods of time. The process of our invention therefore comprises a method of producing a solution or uniform dispersion of an aminotriazine-aldehyde condensation product in a non-drying, semi-drying or drying glyceride oil by heating a mixture of the oil and the reaction product of an acidified alcohol with an incompletely polymerized aminotriazine-aldehyde condensation product.

The broad principles of our invention are not limited to any single aminotriazine-aldehyde condensation product, and any resinophoric material of this class may be used if desired. However, the condensation products of melamine and its derivatives such as 2.4.6 triethyl and triphenyl triamino 1.3.5 triazines, 2.4.6 trihydrazino 1.3.5 triazine and the corresponding condensed triazines such as melam and melem appear at the present time to be of greatest immediate commercial importance, by reason of the availability of melamine and its derivatives from dicyandiamide or cyanuric chloride as raw materials, and for this reason glyceride oil compositions containing these classes of materials in uniform dispersion constitute preferred embodiments of the invention. On the other hand, triazines containing one or two reactive amino groups such as ammeline, ammelide, formoguanamine, 2 amino 1.3.5 triazine and their substitution products as well as nuclear substituted aminotriazines such as 2 chloro 4.6 diamino 1.3.5 triazine, 2 phenyl 4 amino 6 hydroxy 1.3.5 triazine, 6 methyl 2.4 diamino 1.3.5 triazine and the like can be condensed with lower or higher aliphatic, aromatic or heterocyclic aldehydes to produce products capable of improving the properties of glyceride oils, and such condensation products are therefore included in the invention in its broader aspects.

Any of the foregoing aminotriazines, including melamine, substituted melamines and melamine derivatives, can be condensed with any suitable aldehyde of the aliphatic, aromatic or heterocyclic series such as formaldehyde, acetaldehyde, propionaldehyde, butyraldehyde, hexaldehyde, heptaldehyde, crotonaldehyde, allylaldehyde, benzaldehyde, cinnamylaldehyde, furfural and the like to produce incompletely polymerized condensation products which can be uniformly dispersed in glyceride oils in accordance with the principles of the invention.

The condensation between the aminotriazine and the aldehyde may take place under acid, neutral or alkaline conditions, and in the presence or absence of a solvent for the incompletely polymerized reaction products which are first formed. These condensation products may be prepared by any suitable process and in any desired combining ratio of aldehyde to aminotriazine from 1:1 up to and including 6:1. They may then be alkylated by any desired method, such as by heating with an acidified solution of any suitable alcohol such as methanol, propanol, butanol, cyclohexanol, amyl alcohol or the mixture of isomeric amyl alcohols known commercially as "Pentasol." For example a two-stage process may be used in which the amino-triazine and aldehyde are condensed at a pH of 7 or higher and the resulting condensation product is dispersed in the alcohol at a pH of less than 6, or a one-stage process in which both the initial condensation of the aminotriazine and the aldehyde and the subsequent dispersion in alcohol are carried out at a pH of less than 6.

It is known that aminotriazine-aldehyde condensation products can be completely polymerized by heating in the presence of suitable catalysts or curing agents to the stage in which they are insoluble in oils. The same is true with many classes of alkylated aminotriazine-aldehyde condensation products. Obviously such completely reacted condensation products are excluded from the scope of the present invention, and the term 'incompletely polymerized aminotriazine-aldehyde condensation product" or similar terms having the same meaning will be used to indicate that the condensation products contemplated by the present invention are not reacted to the final, oil-insoluble stage.

As has been pointed out any of the products obtained by reacting an acidified alcohol with an incompletely polymerized amino-triazine-aldehyde condensation product can be dissolved or uniformly dispersed in glyceride oils by heating to high temperatures. Any of the oils now used in the paint and varnish industries may be modified in this manner such as linseed oil, perilla oil, soya bean oil, tung oil or oiticica oil as well as other drying oils of similar character such as fish oils, safflower oil, poppy seed oil, walnut oil, cedar nut oil, hempseed oil and the like. Representative semi-drying oils which may be modified by the same procedure are cottonseed oil, sunflower oil, corn oil and apricot oil. The invention may also be advantageously applied to non-drying oils such as castor oil, coconut oil, olive oil, almond oil and the like for the production of varnishes and lacquers. Any of these oils, either singly or in admixture, may be heated with any alcohol reacted, incompletely polymerized aminotriazine-aldehyde condensation product to produce glyceride oil compositions included within the scope of the invention.

The incompletely polymerized alcohol reacted aminotriazine-aldehyde condensation product may be mixed with the oil either in solid form or as a solution in any suitable solvent. In most cases it is preferable to use the alcohol reacted condensation product in the form of a solution as solvents are usually necessary in their preparation. Thus, for example, when the condensation product is reacted by heating with an excess of an acidified alcohol the product is obtained as an alcoholic solution which may be mixed directly with a glyceride oil and heated to obtain a uniform dispersion. Alternatively, however, it is possible to dry the alcoholic solution by vacuum drying at low temperatures and obtain the incompletely polymerized alcohol reacted condensation product in solid form, and the invention also includes the production of dispersions of such solids in glyceride oils with or without heating.

With most aminotriazine-aldehyde condensation products, and particularly with the melamine - formaldehyde condensation products which form the preferred modifying agents of the present invention, we have found that the mixture of oil and condensation product is most suitably blended when it is heated slowly to 180–220° C. and maintained within this temperature range for a period of 15–25 minutes. When the condensation product is added to the oil as a solution in a solvent such as an alcohol the solvent usually distills off during the first part of the heating period. Alcohol from the alcohol reacted aminotriazine-aldehyde condensation product itself is also evolved during this period, as well as a certain amount of aldehyde, so that when the upper temperature range of 180–220° C. is reached there is formed a true solution of the condensation product in the oil. The heating is continued at these high temperatures until a uniform blend is obtained, after which the mass may be allowed to cool and harden.

The invention will be illustrated in greater detail by the following specific examples. It should be understood, however, that although these examples describe certain of the more specific features of the invention they are given primarily for illustrative purposes, and that the invention in its broader aspects is not limited thereto.

Example 1

150 parts of hexamethylol melamine, 300 parts of butanol and 0.75 part of 85% phosphoric acid are stirred together for 30–60 minutes. Heat is then applied and a mixture of butanol and water is distilled off. The butanol is preferably replaced by continuous or intermittent additions of anhydrous butanol and the distillation is continued until all the water is removed and a 50% solution is obtained.

200 parts of linseed oil are heated with 40 parts of the above solution to 210° C. and held at this temperature for 20 minutes. The resulting oil after cooling has a viscosity of H, contains no free butanol and will bake to a hard, clear film.

Example 2

183 parts by weight of 37% formaldehyde solution are adjusted with sodium hydroxide to a pH of 7.5. 63 parts of melamine are added and the mixture is heated to boiling in a vessel equipped with a stirrer and reflux condenser. After refluxing with agitation for about one hour 320 parts of n-butanol acidified with 1 part of 85% phosphoric acid are slowly added.

The solution is refluxed for about one hour longer after which the mixture is dehydrated by distilling off a butanol-water mixture. The distillation is continued with addition of further amounts of butanol until the solution is substantially anhydrous.

100 parts of this solution were adjusted to 50% solids content and mixed with 100 parts of soya bean oil. The mixture was heated slowly to 200° C., collecting the alcohol that distilled off, and held between 180–200° C. for 20 minutes, or until no more alcohol or formaldehyde was released. The oil mixture was then cooled and constituted a baking varnish of excellent characteristics.

Example 3

110 parts of 2.4 diamino 1.3.5 triazine are heated with 243 parts of 37% formaldehyde solution for about 4 hours, or until a clear solution is obtained. 400 parts of cyclohexanol containing 1 part of 85% phosphoric acid are added and the mixture is boiled until all its water content has been removed. Additional cyclohexanol is added during this dehydration so that at the end a solution of 50% solids content is obtained.

200 parts of soya bean oil are mixed with 50 parts of the above solution and heated slowly to 200°–220° C. and held at these temperatures until no more alcohol or formaldehyde is evolved. The resulting composition is well suited for the manufacture of varnishes having improved hardness and water resistance.

Instead of soya bean oil, oiticica oil may be used with similar results.

Example 4

127 parts of ammeline are mixed with 486 parts of 37% formaldehyde and sodium hydroxide solution is added until the pH of the mixture is 8.0. This mixture is refluxed for 2–3 hours, or until reaction is complete, after which 200 parts of butanol are added and sufficient 85% phosphoric acid to neutralize the free alkali and produce a pH of about 5. Water and butanol are distilled off with continuous separation and return of the butanol until the mixture is dehydrated. The concentration is then adjusted to 50% solids.

100 parts of the resulting solution are mixed with 200 parts of castor oil and the mixture is slowly heated to 180° C. with continuous evolution of butanol vapors. The mixture is held at this temperature for 20-25 minutes, or until no more butanol is liberated, after which it is cooled. It constitutes an excellent vehicle for the preparation of lithographic inks.

*Example 5*

200 parts of the butylated melamine-formaldehyde solution described in Example 1 are mixed with 100 parts of cottonseed oil and the mixture is heated slowly to 200° C. When evolution of butanol has stopped the mixture is cooled. The resulting solution is well suited for use in admixture with alkyd resins such as oil-modified phthalic glyceride resins, or with urea-formaldehyde resins in the preparation of paints, varnishes and enamels. For example, 5 moles of formaldehyde in the form of a 37% solution may be heated with 2 moles of urea for about 2 hours, an excess of butanol added, and the heating continued until an organic solvent soluble material is obtained. 100 parts of this urea resin solution of 50% solids content may be mixed with 100 parts of the above described oil composition together with 20 parts of Toluidine Red Toner. The mixture when thinned to spraying consistency with coal tar naphtha forms a red baking enamel that is well suited for application to sheet metal, bicycle frames, wood surfaces and the like either directly or over a primer. After application the enamel may be baked at temperatures of 225-350° F. for periods as short as 5-15 minutes and will produce a hard and glossy film.

*Example 6*

200 parts of a 50% butanol solution of butylated hexamethylol melamine prepared as in Example 1 are mixed with 100-500 parts of raw or kettle-bodied linseed oil. The product may be directly used as a varnish, with or without the addition of suitable amounts of driers, and is suitable for direct application to wood or sheet metal surfaces. When baked at temperatures of 150-350° F., depending on the type of surface to which it is applied, it forms a hard, clear and haze-free film.

It will be noted that in this example a clear solution of an alkylated aminotriazine-aldehyde condensation product was formed by simply dissolving it in a glyceride oil. This procedure may be employed with any drying or semi-drying oil in the production of varnishes for baking purposes, as the subsequent baking step will serve to remove the butanol or other solvent as effectively as would a separate heating step.

What we claim is:

1. A composition comprising essentially the solution obtained by heating a triglyceride oil at 180-220° C. with the product obtained upon reacting an incompletely polymerized aminotriazine-aldehyde condensation product with an alcohol and continuing the heating until no more alcohol is evolved.

2. A composition comprising essentially the solution obtained by heating a triglyceride oil at 180-220° C. with the product obtained upon reacting an incompletely polymerized melamine-aldehyde condensation product with an alcohol and continuing the heating until no more alcohol is evolved.

3. A composition comprising essentially the solution obtained by heating a triglyceride drying oil at 180-220° C. with the product obtained upon reacting an incompletely polymerized melamine-aldehyde condensation product with an alcohol and continuing the heating until no more alcohol is evolved.

4. The method of obtaining a solution of an aminotriazine-aldehyde condensation product in a triglyceride oil which comprises heating the oil at 180-220° C. with the product obtained upon reacting an incompletely polymerized aminotriazine-aldehyde condensation product with an alcohol, and continuing the heating until no more alcohol is evolved.

5. The method of obtaining a solution of a melamine-aldehyde condensation product in a triglyceride oil which comprises heating the oil at 180-220° C. with the product obtained upon reacting an incompletely polymerized melamine-aldehyde condensation product with an alcohol, and continuing the heating until no more alcohol is evolved.

6. The method of obtaining a solution of a melamine-formaldehyde condensation product in a triglyceride oil which comprises heating the oil at 180-220° C. with the product obtained upon reacting an incompletely polymerized melamine-formaldehyde condensation product with an alcohol, and continuing the heating until no more alcohol is evolved.

7. The method of obtaining a solution of an aminotriazine-aldehyde condensation product in a triglyceride drying oil which comprises heating the drying oil at 180-220° C. with the product obtained upon reacting an incompletely polymerized aminotriazine-aldehyde condensation product with an alcohol, and continuing the heating until no more alcohol is evolved.

8. The method of obtaining a solution of a melamine-aldehyde condensation product in a triglyceride drying oil which comprises heating the drying oil at 180-220° C. with the product obtained upon reacting an incompletely polymerized melamine-aldehyde condensation product with an alcohol, and continuing the heating until no more alcohol is evolved.

9. The method of obtaining a solution of a melamine-formaldehyde condensation product in a tryglyceride drying oil which comprises heating the drying oil at 180-220° C. with the product obtained upon reacting an incompletely polymerized melamine-formaldehyde condensation product with an alcohol, and continuing the heating until no more alcohol is evolved.

HERBERT J. WEST.
RALPH EARL LAYMAN, Jr.